INVENTORS
TOMIYUKI TANAKA
TAKAHIRO SUZUKI
TSUNEO KOSUGI
BY
ATTORNEY

INVENTORS
TOMIYUKI TANAKA
TAKAHIRO SUZUKI
TSUNEO KOSUGI
BY [signature]
ATTORNEY

United States Patent Office 3,385,926

Patented May 28, 1968

3,385,926

CONTROL SYSTEM IN A MAGNETIC RECORDING AND REPRODUCING APPARATUS

Tomiyuki Tanaka and Takahiro Suzuki, Tokyo, and Tsuneo Kosugi, Yokohama, Japan, assignors to Victor Company of Japan, Limited, Kanagawa-ken, Japan Filed Nov. 9, 1964, Ser. No. 409,786
Claims priority, application Japan, Nov. 12, 1963, 38/60,759
7 Claims. (Cl. 178—6.6)

ABSTRACT OF THE DISCLOSURE

A magnetic recording and reproducing system records high frequency signals on a magnetic medium. Signals are reproduced from the medium by a rotary magnetic head assembly driven by a synchronous motor responsive to a control signal, having a synchronous characteristic, which is recorded on the medium along with a television signal. The rotor of the motor is biased by a permanent ferrite magnet so that the motor behaves as a synchronous motor when running below a given load torque and as an induction motor when running above the given load torque.

This invention relates to a control system in a magnetic recording and reproducing apparatus, and more particularly relates to a tracking control system in a magnetic recording and reproducing apparatus in which signals having relative high frequency such as television image signals are recorded on a recording medium by rotary magnetic heads and the signals are reproduced.

When one field or one frame of standard television image signals is recorded and reproduced on a track by means of a plurality of rotary magnetic heads, it is quite efficient to provide means to record the vertical synchronizing signal at both edges of the magnetic tape when the signal is recorded since the picture distortion of the switching transient is within the vertical blanking area. In order to accomplish this means, the rotating phase of the rotary magnetic heads is to be made to coincide exactly with the phase of the synchronizing signal by developing a sine-wave signal from the vertical synchronizing signal and applying the sine wave signal to the motor for the rotary magnetic heads during recording.

During reproduction it is necessary to provide a means by which the rotary magnetic heads scan exactly the track of the magnetic tape. A control signal indicating the location of the recording track is recorded on the magnetic tape when the track is recorded and a signal for driving the motor is developed by means of a circuit in which only a variation of long period in frequency is obtained by removing the variation in velocity of short period of the control signal. The signal so developed is supplied to the motor for the rotary magnetic heads, and tracking can be obtained without any control of the velocity of the tape at the capstan.

It is an object of this invention to provide a control system in a magnetic recording and reproducing apparatus in which the reproducing heads scan exactly the recorded track.

It is a further object of this invention to provide a control system in a magnetic recording and reproducing apparatus wherein the motor for the rotary magnetic heads rotates under a condition in which the frequency and phase of the signal for driving the motor have a predetermined constant relation with respect to the frequency and phase of the control signal when it is recorded on the magnetic tape.

Figure 1:
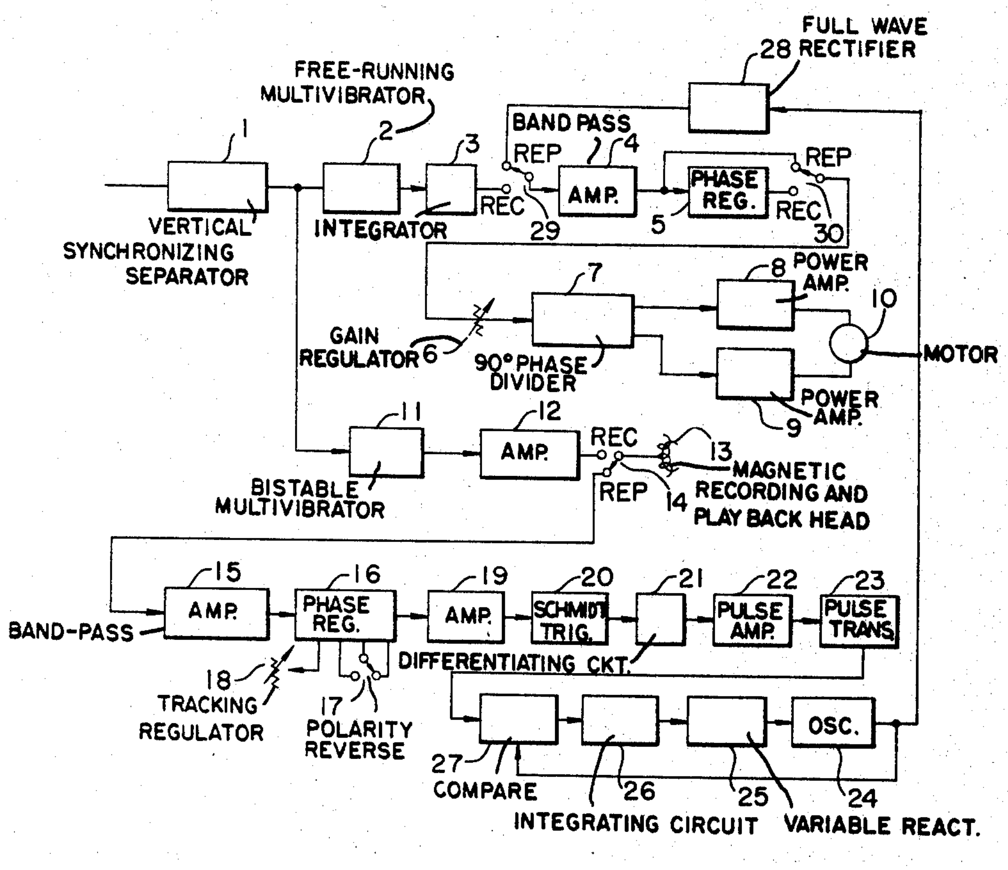
Figure 2:
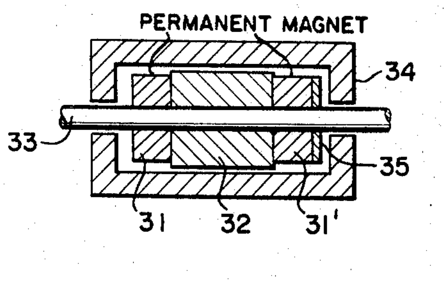
Figure 3:
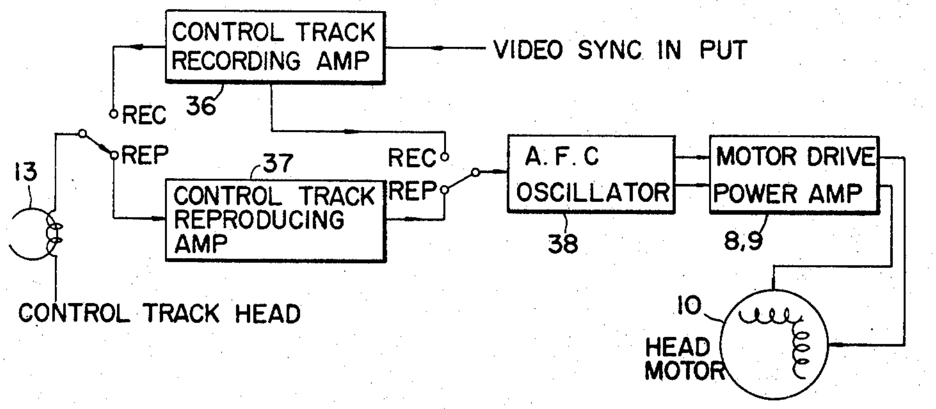
Figure 4:
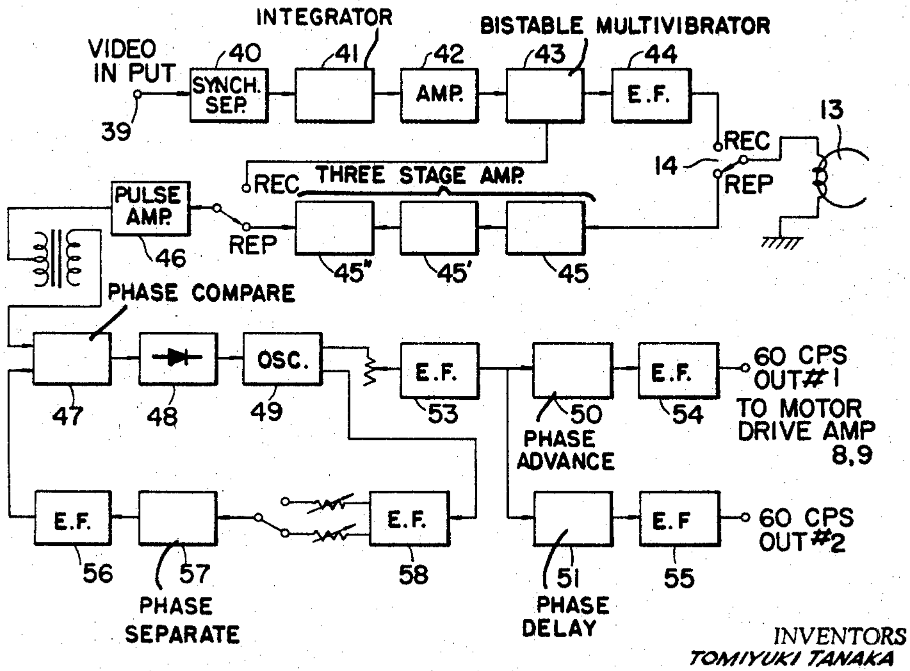

The objects and advantages of this invention will become readily apparent from the following detailed description, in which:

FIG. 1 is a block diagram showing an embodiment of a control system provided in accordance with the invention, FIG. 2 is a vertical cross-sectional view of the motor for the rotary magnetic heads utilized in the control system shown in FIG. 1, FIG. 3 is a block diagram showing another embodiment of a control system provided in accordance with the invention, and FIG. 4 is a detailed block diagram of the embodiment shown in FIG. 3.

In FIG. 1, in recording the control signal, the standard image synchronizing signals in the standard television image signals are supplied to a vertical synchronizing separator 1, from which only vertical synchronizing signals are taken out. The vertical synchronizing signals trigger a free running multivibrator 2 to generate a rectangular wave of 60 c./s. which is coincident with the phase of the vertical synchronizing signals.

The oscillatory output from multivibrator 2 is made into a nearly triangular wave by means of an integrator circuit 3 and is supplied to a band pass amplifier 4 with 60 c./s. as its center frequency through a change over switch 29 at its lower position, identified as "REC." The output from integrator circuit 3 is shaped to be a sine wave of low distortion ratio in a band pass amplifier 4 and is introduced into a phase regulator 5 which is operative during recording to maintain a predetermined phase relation between the input synchronizing signals and the rotation of the rotary magnetic heads. The output from integrator circuit 3 is divided into two phases by a 90° phase divider 7 after the output passes through a gain regulator 6 when a change over switch 30 is in a recording condition, i.e. when switch 30 is in its lower position identified as "REC." The phase division is necessary because the synchronous motor for the rotary magnetic heads has two phase windings.

The 60 c./s. signals having a 90° phase difference are amplified by power amplifiers 8 and 9 and supplied to the stator windings of the motor 10 for the rotary magnetic heads. Meanwhile, the output from vertical synchronizing separator 1 is used to generate a rectangular wave of 30 c./s. synchronized with the input vertical synchronizing signals by means of a bistable multivibrator 11. The output signal of multivibrator 11 is supplied through an amplifier 12 to a magnetic head 13 to record a control signal on a central track on the magnetic tape.

In reproduction, change over switches 14, 29 and 30 are changed over and the control signals of 30 c./s. are reproduced. The reproduced signals are taken out from magnetic head 13 and amplified by a band amplifier 15 having its center frequency at 30 c./s. through change over switch 14 in its lower position, identified as "REP." The phase of the output signal of amplifier 15 is adjusted properly by means of a regulator 16 for the regenerated phase, a regulator 18 for tracking and a switcher 17 for reversing polarities. The signal of 30 c./s. is shaped to be a rectangular wave by means of an amplifier 19 and a Schmitt msltivibrator 20, and pulses are developed therefrom by means of a differentiating circuit 21 and are supplied through a pulse amplifier to the primary winding of a pulse transformer 23. Meanwhile a CR oscillator 24 having a center frequency at 30 c./s. is operative to generate an output by which variation in frequency is obtained in proportion to the input voltage by means of a variable reactance circuit 25. An error voltage is developed by a comparison circuit 27 which compares the 30 c./s. sine wave output of oscillator 24 30 c./s. with the pulses in the secondary winding of pulse transformer 23. When the error voltage is supplied to variable reactance circuit 25 through an integrating circuit 26, reactance circuit 25 operates automatically to coincide the phase of the input with the phase of the output. The phase of sine wave of 30 c./s. is kept to maintain a constant relation to the phase of the reproducing input of the control track. Integrating circuit 26 is indispensable because the high frequency component of the dynamic variation in the input phase is to be eliminated and the variation in the output phase is to be adjusted.

When the high frequency component is applied to the motor for the rotary magnetic head, since the phase of the motor varies in a much wider range than the variation in the tape velocity, the time error of the television image signals becomes larger over the necessary range.

In order to multiply the output of 30 c./s. to develop a signal of 60 c/s., for driving the motor, the band pass amplifier 4 having a center frequency of 60 c./s. is respectively utilized by means of a full-wave rectifier 28 and a change over switch 29 at its upper position, identified as "REP." The sine wave signal of 60 c./s. with low distortion shaped by the band pass amplifier is divided into two signals having a 90° phase difference through a change over switch 30 at its upper position, identified as "REP," and is power amplified and supplied to a motor 10 for rotary magnetic heads.

The construction of the synchronous motor for rotary magnetic heads is explained in detail as follows: In FIG. 2 a pair of ferrite permanent magnets 31 and 31' are so polarized that the same poles are at the same side and rotate integral with a rotor 32 fixed on a shaft 33. Magnets 31 and 31' are also fixed on shaft 33. A stator 34 is spaced from magnets 31 and 31'.

The operation of the motor for rotary magnetic heads is as follows: the rotor and the stator causes the combination to operate as a simple induction motor adding the permanent magnet to the combination modifies the torque speed characteristics of the motor in such manner that the characteristics of the motor is similar to that of a synchronous motor when the load torque is under a certain limit and the rotary phase of the motor is maintained to be in a certain relation with respect to the phase of an electrical input. When the motor pulls out from the synchronization, the motor behaves as a conventional induction motor, however, in this invention the range in which the motor pulls out is not utilized. As the motor has four poles, the relation between the mechanical angle and the input electrical angle is expressed as $1=2$. Therefore, two mechanical positions are actually given for one electrical input. The air gap between permanent magnets 31 and 31' and stator 34 are selected according to the starting performance and the phase accuracy of the motor.

As the motor shown in FIG. 1 is constructed in accordance with above teching, the rotary magnetic head can rotate at a constant angular velocity.

The embodiment shown in FIG. 3 is explained as follows: the apparatus comprises an amplifier 36 for recording the control track, an amplifier 37 for reproducing the control track, AFC oscillator 38, power amplifiers 8 and 9 for driving the motor and motor 10 for the rotary magnetic head. The operation of the servo circuit is explained individually in respect to the recording of the control track, the reproduction of the control track and the AFC oscillator.

Amplifiers 36 and 37 are used as circuits in which the rectangular wave of 30 c./s. triggered by the vertical pulse separated from the input image synchronizing signals by the vertical synchronizing separator, is applied to magnetic track head 13 for the control signal and in which the pulses reproduced by the same track head is shaped and amplified. In FIG. 4, when the standard image synchronizing signals of 0.5 v.p.p. to 1.5 v.p.p. is supplied to a video input terminal 39, a negative synchronizing signal having its image part clipped is obtained in a synchronous separator 40. Only the vertical pulses of the negative synchronizing signals are picked up by an integrator circuit 41 and, after amplification by an amplifier 42, the vertical pulses trigger bistable multivibrator 43 to obtain a rectangular wave of 30 c./s. The rectangular wave of 30 c./s. is recorded on the magnetic tape after passing through an emitter follower 44 and a change over switch 14 at its upper position identified as "REC." On the other hand, when reproducing, the pulses of 30 c./s. reproduced through the control track head pass through change over switch 14 at its lower position identified as "REP" and are amplified three times by amplifiers 45, 45' and 45'' to produce negative pulses of 18 v.p.p.

The AFC oscillator supplies pulses of 30 c./s. shaped from the vertical pulse in recording status to power amplifiers 8 and 9 and also supplies signals of 60 c./s. having low distortion (ratio) synchronized in phase with the pulses of 30 c./s. shaped from the control track pulses in reproducing status to power amplifiers 8 and 9. The AFC oscillator includes a fly wheel oscillator which is able to eliminate the high frequency component of variation in phase of the input pulses. As the wow and flatter of the tape are included in the control track signals to be reproduced, if the motor for rotary magnetic head completely follows the phase of the control track signals, a variation in the relative velocity of 100 times actual variation is generated. The AFC within the image monitor cannot be supplemented and a jitter occurs in the picture. Under recording status the problem stated above does not occur and, therefore, the following characteristics of the oscillator is switched over by a relay in accordance with recording or reproducing. As three amplifiers are provided for reproducing the control track, the recording pulses of 30 c./s. are inversely phased with the recording signals of the control track. In other words, a differential output of the rectangular wave of multivibrator 43, is supplied to a phase amplifier 46. The output of phase amplifier 46 is applied to a Terman type oscillator 49 through a phase comparator 47 for the AFC sine wave and a diode switching circuit 48, and the output from oscillator 49 is fed back to phase comparator 47 to synchronize with the input pulses. The output from oscillator 49 is also supplied to amplifiers 8 and 9 after being divided into two phases having a 90° phase difference therebetween by means of a phase advancing circuit 50 and a phase delaying circuit 51, each having a 45° phase difference, through emitter followers 53, 54 and 55. A feedback circuit is provided comprising a DC coupled emitter follower amplifier 56, a phase separator 57 and an emitter follower 58 serving as a phase shifter for adjusting the phase relation between the AFC oscillating output and the input sampling pulses.

As stated above, in the invention, in a recording and reproducing apparatus in which signals of relative high frequency, such as the television image signals, are recorded on a magnetic medium by means of a rotary magnetic head and the signals are reproduced, a constant relation is kept between the frequency and the phase of the signals driving the motor for rotary magnetic head and the frequency and the phase of the control signal so that the track used when recording coincide with the track used when reproducing.

While preferred embodiments of the present invention are disclosed, it is recognized that the scope of the present invention is not limited thereto and it is therefore intended that the scope of the present invention be defined by the appended claims.

What is claimed is:

1. In a magnetic recording and reproducing system including a rotary magnetic head assembly for recording signals of relatively high frequencies on tracks of a magnetic medium and for reproducing said signals from said track, synchronous motor means for driving said magnetic head assembly, means for supplying a control signal, and control means responsive to said control signal for applying a drive signal to said synchronous motor means while maintaining a constant relation between the frequency and phase of said control and drive signals, said synchronous motor means including a stator, and a rotatable permanent magnet cooperable with said stator, said permanent magnet being of ferrite material to provide low eddy current losses and a high effective Q.

2. In a magnetic recording and reproducing system as defined in claim 1, said synchronous motor means further including a rotor rotatable with said permanent magnet and cooperable with said stator for operation as an induction motor until the load torque is below a certain limit.

3. In a magnetic recording and reproducing system as defined in claim 2, said synchronous motor means further including a second permanent magnet of ferrite material, said permanent magnets being located on opposite sides of said rotor.

4. In a magnetic recording and reproducing system as defined in claim 1, said control means including oscillator means for developing a drive signal having a sinewave form, and synchronizing means for synchronizing the operation of said oscillator means with said control signal.

5. In a magnetic recording and reproducing system as defined in claim 4, said synchronizing means including a phase control circuit for controlling said oscillator means, and a phase comparator circuit for controlling said phase control circuit, and means for applying said control signal and a signal from the output of said oscillator means to said phase comparator circuit.

6. In a magnetic recording and reproducing system as defined in claim 1, arranged for recording television signals having vertical synchronizing pulse components, means for recording said synchronizing pulse components on a control track, means operative during recording for deriving said control signal from said synchronizing pulse components, and means operative during reproducing for deriving said control signal from the reproducing synchronizing pulse components.

7. In a magnetic recording and reproducing system as defined in claim 5, arranged for recording television signals having vertical synchronizing pulse components, means for generating a recording signal being synchronized with said vertical synchronizing pulse components, means for recording said recording signal on a control track, means operative during recording for deriving said control signal from said synchronizing pulse components, and means operative during reproducing for deriving said control signal from reproducing said recording signal.

References Cited

UNITED STATES PATENTS 3,179,752 4/1965 Brenner.
3,293,359 12/1966 Yasuoka.

ROBERT L. GRIFFIN, *Primary Examiner.*

JOHN W. CALDWELL, *Examiner.*

H. W. BRITTON, *Assistant Examiner.*